March 10, 1959   J. S. GOLIGHTLY ET AL   2,876,595
GLASS BENDING MOLDS
Filed June 21, 1954   2 Sheets-Sheet 1

INVENTORS
JAMES S. GOLIGHTLY and
WILLIAM C. McROBERTS

Oscar L. Spencer
ATTORNEY

March 10, 1959  J. S. GOLIGHTLY ET AL  2,876,595
GLASS BENDING MOLDS

Filed June 21, 1954  2 Sheets-Sheet 2

INVENTORS
JAMES S. GOLIGHTLY and
WILLIAM C. McROBERTS

Oscar H. Spencer
ATTORNEY

United States Patent Office

2,876,595
Patented Mar. 10, 1959

2,876,595

GLASS BENDING MOLDS

James S. Golightly, Tarentum, and William C. McRoberts, New Kensington, Pa., assignors to Pittsburgh Plate Glass Company Application June 21, 1954, Serial No. 438,016

3 Claims. (Cl. 49—67)

The present invention relates to glass bending molds. Specifically, the present invention concerns improvements in skeleton type bending molds facilitating bending of flat glass sheets into extremely complex curvatures wherein the radius of curvature of the bent glass sheets varies both longitudinally and transversely thereof.

Conventionally, sheets of flat glass have been bent into desired windshield patterns by cutting the flat sheets into the shape desired for the finished product, supporting the sheets upon a bending mold, and gradually heating the glass and the mold to avoid thermal shock thus softening the glass. The glass, softened by heat, conforms to the curvature of the mold.

Due to the increased size and complexity of curved windshields and backlights presently desired by automobile manufacturers, it has become necessary to complicate the structure of molds required to bend glass. A typical example of the complex curvatures required is a windshield bent to a comparatively shallow curvature in its central portion merging into regions of rapidly reducing radii of curvature to form opposing substantially parallel flat extremities.

A principal object of the present invention is to provide apparatus for bending flat sheets of glass into complex curvatures.

Another object of the present invention is to provide in glass bending molds means for preventing overbending of certain portions of a flat glass sheet while allowing other portion of the sheet to be bent to varying degrees of curvature.

These and other objects of the present invention will become obvious upon study of the following description of a particular embodiment of the invention taken in conjunction with the accompanying drawings. The recitation of the embodiments described is for purpose of illustration rather than limitation.

Figure 1:
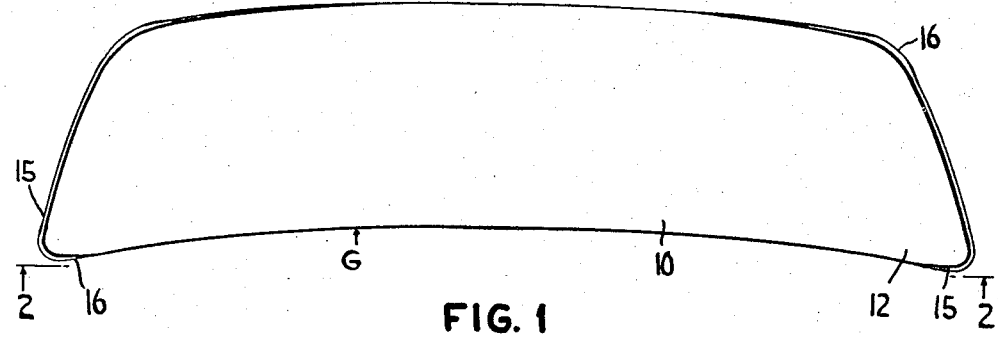
Figure 1 is a plan view of a portion of a sheet of glass bent according to present day requirements.
Figure 2:
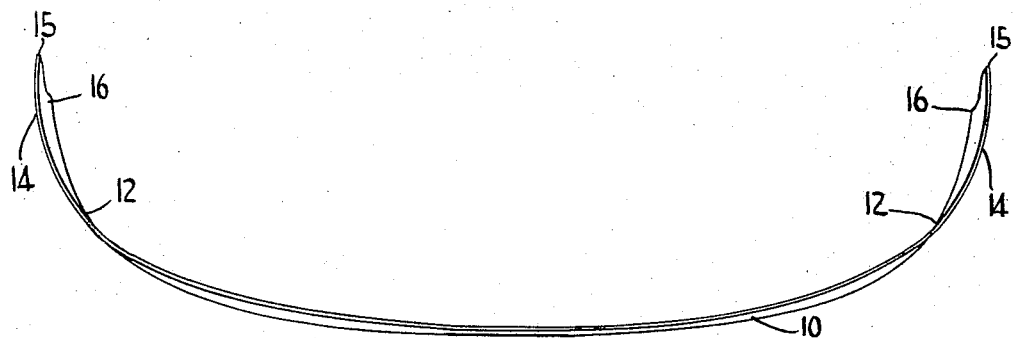
Figure 2 is a view at right angles to Figure 1 along the lines 2—2 thereof.

Referring to the drawings, Figures 1 and 2 depict a glass sheet G having a central portion 10 of relatively shallow curvature, merging into areas 12 where the radius diminishes rapidly and end sections 14 having one side edge 15 and another side edge 16. Such a sheet of glass is required to be bent cylindrically in its central portion 10 along a fairly shallow curvature merging into cylindrical bends at the portions 12 of increasingly sharper curvature.

Figure 3:
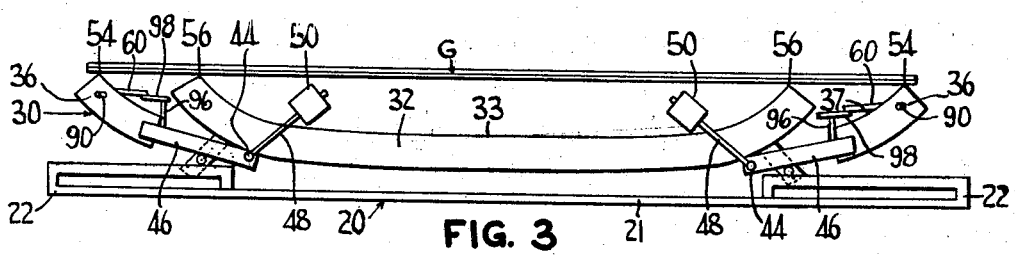
Figure 3 is a side elevational view of a typical mold shown in the open position supporting a sheet of flat glass.
Figure 4:
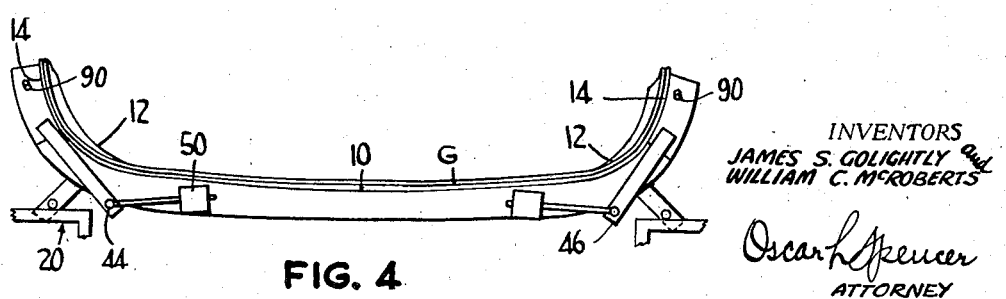
Figure 4 is a partial side elevational view of the mold of Figure 3 showing the latter in closed position containing a bent sheet of glass.

Referring to Figures 3 and 4, reference number 20 depicts a mold carrying frame provided with a pair of spaced longitudinal side members 21 of L-shaped configuration and a pair of cross members 22 connecting the ends of the side members. The cross members also may be L-shaped in configuration for additional rigidity. A mold 30 comprising a main central mold member 32 and spaced wing members 36 is supported through its central member 32 by fixed attachment to the mold supporting frame 20.

The upper surface 33 of the main central mold member 32 and the upper surface 37 of the wing members 36 are shaped to the contour desired for the corresponding portions of the bent glass sheet. Transversely extending braces 40 interconnect the opposing sides of center mold member 32, while similar braces 42 interconnect the opposing longitudinal sides of the wing members 36 to improve the rigidity of the mold structure. These braces are preferably removed as far as possible from surfaces 33 and 37 in order to minimize localized heat variations to which adjacent portions of the glass sheet are subjected.

Wing members 36 are pivoted about pivots 44. Extensions 46 may be attached to each wing member 36 in order to provide a pivotal connection, or the pivots may be attached directly to the wing members, depending on the curved shape required for the glass. A lever arm 48 provided with a weight 50 is attached to the wing member 36 in such a manner that the weight 50 counterbalances the weight of its wing member 36 about the pivot 44.

When the mold is not subjected to a load, such as a flat glass sheet, the mold tends to be in a closed position whereby the wing members 36 are rotated into the position depicted in Figure 4. In this position surfaces 37, 33 and 37 form a continuous skeleton conforming to the shape desired for a glass sheet to be bent on the mold.

The wing members 36 are rotatable to an open position such as shown in Fig. 3 to receive pair of flat sheets of glass. At this open position, the length of the mold is slightly less than that of the flat sheet of glass to be bent, this difference in length preferably not exceeding ½ inch. In the open mold position, the flat glass is supported at the outboard extremities 54 of each wing member 36 and also, preferably, at the outboard extremities 56 of the fixed center member 32. Such molds are referred to as center supporting molds in this description.

In operation, one or more flat sheets of glass G are mounted on the open mold. The glass and the mold are then conveyed into a bending lehr where the glass and the mold are gradually heated to prevent thermal shock. The glass, which was rigid while cold, softens upon the application of heat. The center portion 10 of the glass conforms to the center portion 32 of the mold, and the area of contact between the softening glass and the center portion of the mold increases. The weighted lever arms 48 then force the extremities 14 of the heat softened glass G to curl upwardly to conform to surfaces 37 of the mold. A stop member 53 limits the closing movement of the mold by contact with rotating lever arm 48.

According to one embodiment of the present invention, this particular transverse shaping at the longitudinal extremities of the glass is accomplished by attaching a web or heat absorber member 60 to the skeleton structure of wing member 36. Webs 60 behave as heat sinks to absorb a certain proportion of the heat that otherwise would be absorbed by the adjacent portion of the glass sheet to be bent.

In cases where glass sheets have very narrow longitudinal extremities, failure to provide these webs 60 may result in an excess softening of the glass at their narrow extremities where the surface to volume ratio is greater than at other portions of the glass. Therefore, when heat is applied to the glass, the rotation of the wing members 36 may tend to cause the longitudinal extremities of the glass to curl to a greater degree than desired. The provision of heat sinks prevents the extremities from softening too readily upon the application of heat thereto. Since the glass adjacent the heat sinks is relatively hard due to the presence of the webs at the extremities of the mold, this tendency of the glass sections 14 to overbend is minimized.

In certain instances, the differences in bending adjacent areas of the glass sheet requires the use of very heavy webs. This requires very heavy weights 50 to rotate the heavy wing sections 36 into closed position. The present invention is designed to overcome this difficulty.

Figure 5:
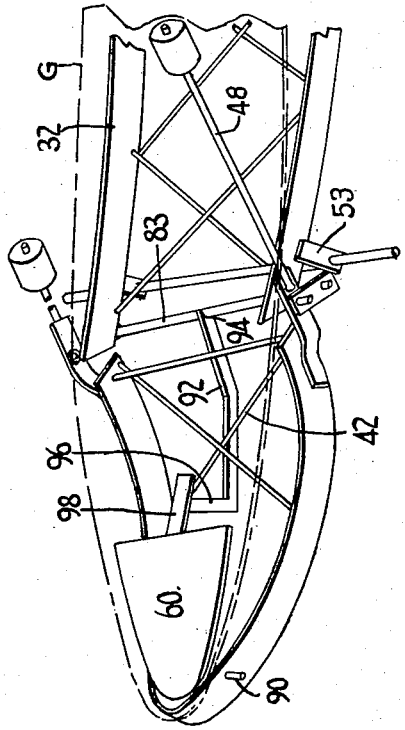
Figures 5 and 6 are isometric views of a portion of an embodiment of the bending mold according to the present invention showing the latter in open and closed position respectively.
Figure 6:
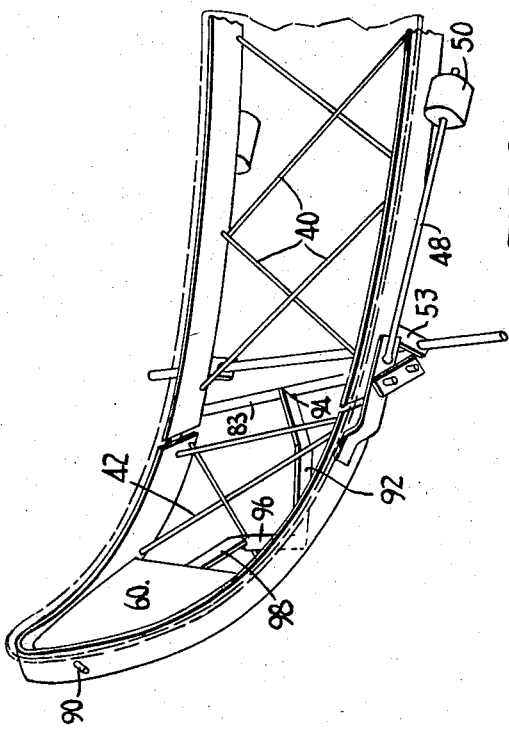

The web structure is shown in Figures 5 and 6. The webs 60 are each pivoted about a hinge rod 90 extending across each wing portion 36 below shaping surface 37. An L-shaped member 92 is attached at one horizontal extremity 94 to a transverse rod 83 at each extremity of center portion 32. An upwardly directed finger 96 forms a part of the L-shaped member that contacts the under surface of the web and helps support the latter by sliding engagement with a finger 98 extending inwardly of the web 60. Thus, when the mold is in open position as shown in Figure 5, the finger 96 forces the web 60 into a substantially horizontal position and, when the mold is in closed position, the web is supported in a substantially vertical plane. As the mold moves from open to closed position, the web 60 slides over the finger 96 and pivots about the hinge rod 90 to change its orientation from the horizontal position gradually toward the vertical.

While the terms "webbing" and "webs" have been utilized extensively to describe the heat absorbing members 60, it is understood that these terms are not limited to a plate or a sheet or a network of delicate threads but are intended to include any member having a relatively large thermal capacity compared to that of an equivalent area of glass. Such a heat absorbing member has heat absorbing properties that is capable of abstracting heat from a portion of a sheet of glass being bent in a region where a differential application of heat is required to avoid overbending the glass in this region.

What is claimed is:

1. In a sectionalized bending mold for bending glass sheets comprising a first mold member and a wing member pivotally mounted relative to said first mold member, each of said members having an upper surface shaped to conform to the contour desired for a different portion of the bent glass sheets, said members being relatively movable into an open position for supporting flat glass sheets for bending and into a closed position to define a substantially continuous skeleton conforming to the shape desired for the bent glass sheets, said substantially continuous skeleton enclosing an area including a relatively flat region enclosed by said wing member, a heat absorber member having a relatively large thermal capacity compared to that of an equivalent area of glass pivotedly connected to said wing member along an axis disposed below said upper surface to permit said heat absorber member to occupy a location aligned with and below said flat region of said area, support means connected to the first mold member and means operably associated with said heat absorber member and in sliding engagement with said support means, permitting said heat absorber member to pivot relative to said wing member when said wing member pivots relative to said first mold member.

2. Apparatus for bending glass sheets comprising a mold carrying frame, a sectionalized, skeletonized mold carried by said mold carrying frame and comprising a central mold member fixed in position relative to said mold carrying frame and wing members pivotally mounted relative to said central mold member, each of said members having an upper surface shaped to conform to the contour desired for a different portion of the bent glass sheets, said wing members being rotatable into a lowered, open position for supporting flat glass sheets for bending and into a raised, closed position to define a substantially continuous skeleton conforming to the shape desired for the bent glass sheets, said substantially continuous skeleton enclosing an area including relatively flat regions, each enclosed by one of said wing members, a heat absorber member having a relatively large thermal capacity compared to that of an equivalent area of glass pivotedly connected to each wing member along an axis disposed below said upper surface to permit said heat absorber member to occupy a location aligned with and below one of said flat regions, means operatively associated with each wing member for pivoting the latter and its pivoted heat absorber member upwardly into the raised closed position, support means connected to said central mold member, and means operably associated with said heat absorber member and in sliding engagement with said support means, permitting said heat absorber member to pivot relative to its pivotally connected wing member when said wing member pivots relative to said central mold member.

3. Apparatus as in claim 2, wherein said support means comprises a support member extending longitudinally outboard of said central mold member and said means operably associated with said heat absorber member comprises a finger extending longitudinally inwardly of said heat absorber member in alignment with said support member.

References Cited in the file of this patent

UNITED STATES PATENTS

| | | |
|---|---|---|
| 2,057,763 | Boyles et al. | Oct. 20, 1936 |
| 2,348,278 | Boyles et al. | May 9, 1944 |
| 2,450,297 | Pearse et al. | Sept. 28, 1948 |
| 2,452,488 | Paddock et al. | Oct. 26, 1948 |
| 2,688,210 | Jendrisak | Sept. 7, 1954 |
| 2,720,729 | Rugg | Oct. 18, 1955 |

FOREIGN PATENTS

| | | |
|---|---|---|
| 22,051 | France | Nov. 30, 1920 |
| 710,393 | Great Britain | June 9, 1954 |